United States Patent
Bernecky

(10) Patent No.: US 7,800,978 B2
(45) Date of Patent: Sep. 21, 2010

(54) METHOD FOR REAL TIME MATCHED FIELD PROCESSING

(75) Inventor: W. Robert Bernecky, Mystic, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 875 days.

(21) Appl. No.: 11/699,246

(22) Filed: Jan. 30, 2007

(65) Prior Publication Data

US 2008/0181056 A1 Jul. 31, 2008

(51) Int. Cl.
*G01S 3/80* (2006.01)
(52) U.S. Cl. ...................... 367/124; 367/118
(58) Field of Classification Search ................. 367/100, 367/118, 119, 124
See application file for complete search history.

(56) References Cited

U.S. PATENT DOCUMENTS

| | | | |
|---|---|---|---|
| 4,965,732 A | 10/1990 | Roy, III et al. | |
| 5,216,640 A * | 6/1993 | Donald et al. | 367/124 |
| 5,481,505 A | 1/1996 | Donald et al. | |
| 5,559,755 A | 9/1996 | Beam | |
| 5,777,949 A | 7/1998 | MacLeod et al. | |
| 5,995,905 A | 11/1999 | Ikelle et al. | |
| 6,424,596 B1 * | 7/2002 | Donald | 367/124 |
| 6,525,994 B2 * | 2/2003 | Donald et al. | 367/124 |
| 7,319,640 B1 * | 1/2008 | Donald et al. | 367/124 |
| 2003/0231547 A1 * | 12/2003 | Yang | 367/11 |

OTHER PUBLICATIONS

Bucker, H.P., "Use of Calculated Sound Fields and Matched Field Detection to Locate Sound Source in Shallow Water", Article, Feb. 1976, pp. 368-373, vol. 59, No. 2, Journal of the Acoustical Society of America, USA.
Baggeroer, A.B., Kuperman, William A. and Mikhalevwsky, Peter N., "An Overview of Matched Fields Methods in Ocean Acoustics", Article, Oct. 1993, pp. 401-424, vol. 18, No. 4, IEEE Journal of Oceanic Eng. USA.
Fizell, R.G. and Wales, S.C., "Source Localization in Range and Depth in an Arctic Environment", Paper, 1985, pp. S57, vol. 78, Journal of the Acoustical Society of America, Suppl., USA.

* cited by examiner

*Primary Examiner*—Ian J Lobo
(74) *Attorney, Agent, or Firm*—James M. Kasischke; Michael P. Stanley; Jean-Paul A. Nasser

(57) ABSTRACT

A method for utilizing a matched field-processing algorithm employing a number of sensors wherein the sensor output is the measured acoustic data as the first input and is translated to a frequency by applying a Fourier transform to a set of time samples as a data vector output. A replica vector is the second data input as a predicted quantity which is computed by an acoustic model with an assumed acoustic location. The output is an ambiguity surface ranging between zero and one with the highest values indicating the likely position of an acoustic location. The matched field response is generalized by averaging the response over multiple frequencies. A response for an array may be computed by forming beams and then combining them by multiplying each by an eigenray factor before summing. The computation of the response may be further defined by voxel interpolation.

12 Claims, 4 Drawing Sheets

METHOD FOR REAL TIME MATCHED FIELD PROCESSING

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This application is co-pending with related application, application Ser. No. 11/767,787; filed 25 Jun. 2007, entitled "Point Source Localization Sonar System and Method" by co-inventors, W. Robert Bernecky and Matthew J. Krzych.

BACKGROUND OF THE INVENTION (1) Field of the Invention

The present invention relates to a method for computing a real time matched field response using sensor outputs of a passive sonar array.

(2) Description of the Prior Art

Matched field processing (MFP) is a sonar signal processing technique that incorporates acoustic propagation modeling into signal processing algorithms. MFP provides for localization of an acoustic point source in three dimensions.

In operation, the MFP beamformer matches the sound pressure field measured by an array of hydrophone sensors with a replica. The replica is derived from an acoustic propagation model and presumes a specific location for the acoustic source. That is, each hypothetical location of the presumed sound source determines, in conjunction with oceanic acoustic propagation parameters, a particular replica.

Each replica is matched with the measured field, and the maximum values computed by the MFP represent the replicas that most closely represent the received, measured signal. This information enables the MFP to estimate the location of a sound source in range (distance), bearing and depth.

Previous methods for computing a broadband matched field surface have various shortcomings. In a first shortcoming, the methods are computationally expensive. The methods are also not suitable for producing results in real time because the methods do not compute results at a rate equal to the rate of the incoming sensor data. Furthermore, the methods use stationary, vertically oriented arrays and cannot be used on mobile, horizontally towed sensor arrays. Also, no previous method efficiently compensates for the changing shape of a towed array of sensors.

As such, a need exists for computing a broadband matched field surface in real time as an improved method of determining the distance, angular bearing and depth of an acoustic source relative to a sonar sensor array. Preferably, the method would be flexible and mobile as well as comparatively inexpensive to existing methods.

SUMMARY OF THE INVENTION

Accordingly, it is a general purpose and primary object of the present invention to provide a method for determining real time matched field responses.

It is a further object of the present invention to provide a cost-effective method for determining real time matched field responses.

It is a still further object of the present invention to provide a mobile method for determining real time matched field responses.

In order to attain the objects of the present invention, a method is provided for computing real time matched field responses. The method utilizes an algorithm and requires two data inputs. The first data input is measured acoustic data from a sonar set of hydrophones. The second data input is a replica data set against which the measured data is compared. Multiple replicas are compared to the measured data and the closest match is retained. The closest match of the replica is presumed to characterize the data in some important way (e.g., a source location).

More specifically, the output of a sensor of the towed array is translated to the frequency domain by applying a discrete Fourier transform (DFT) or a fast Fourier transform (FFT) to a set of contiguous time samples x (n, t=$T_0$ to $T_{max}$). A replica vector (d) is the frequency domain N×1 vector representing the predicted or expected values at each sensor of the sensor array for a specific frequency.

The corresponding output of the method is an ambiguity surface. The ambiguity surface is a set of numbers ranging between zero and one with each number corresponding to a specific location in the ocean. The highest values on the ambiguity surface indicate the most likely position of an acoustic source.

BRIEF DESCRIPTION OF THE DRAWINGS

Further objects and advantages of the invention will become readily apparent from the following detailed description and claims in conjunction with the accompanying drawings in which:

DETAILED DESCRIPTION OF THE INVENTION

Figure 1:
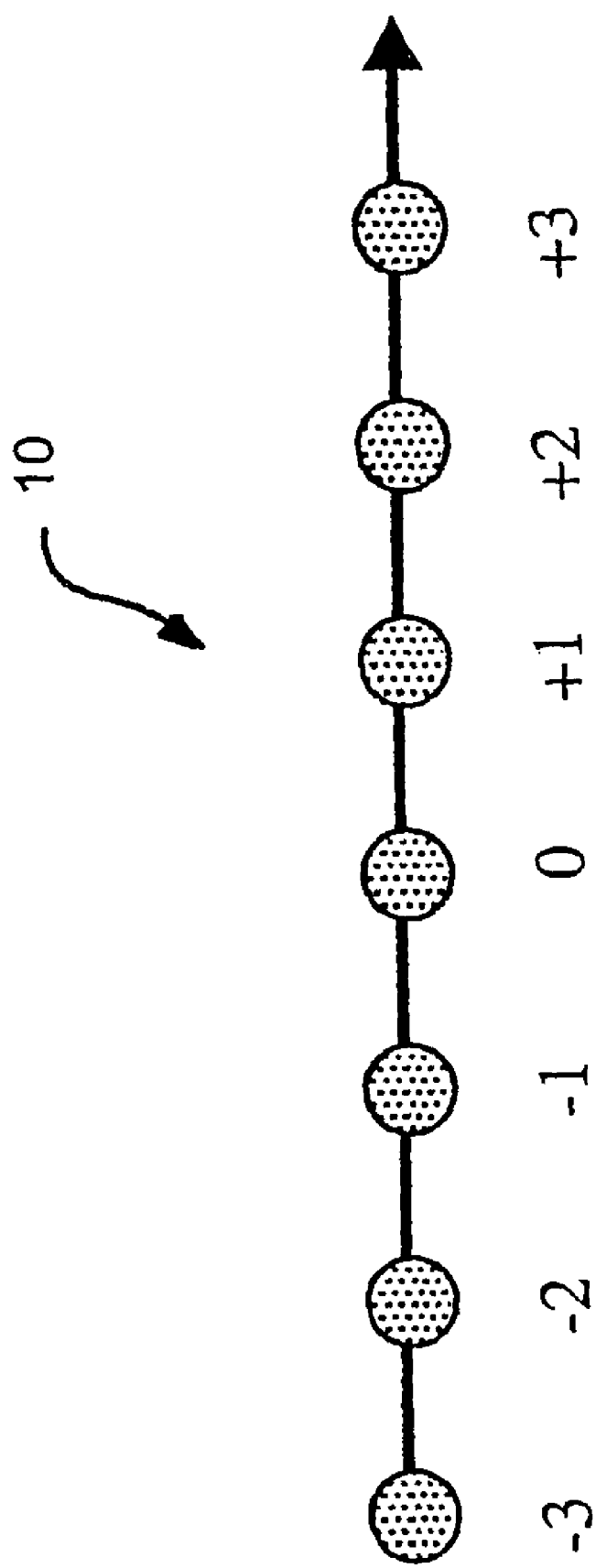
FIG. 1 depicts a horizontal line array of equispaced sensors.

A more complete understanding of the invention and many of the attendant advantages thereto will be readily appreciated as the same becomes better understood by reference to the following detailed description when considered in conjunction with the accompanying drawings wherein like reference numerals and symbols designate identical and corresponding parts through the view and wherein:

The method of the present invention for real time matched field processing primarily utilizes a matched field-processing algorithm and requires two data inputs.

The first data input is measured acoustic data from at least one sensor of a sonar array of hydrophones. The second data input is a predicted data set, or a replica data set—against which the measured data is compared. Multiple replicas are compared to the measured data and the closest match is retained. The closest match of the replica is presumed to characterize the data in some important way (e.g., a source location).

Referring now to the drawings in detail wherein like numerals indicate like elements throughout the several views, FIG. 1 reflects the requirements of the method as applied with a matched field-processing algorithm utilizing a horizontal line sensor array 10 of "N" (a number of equispaced sensors). The output of sensor "n" (the assigned sensor number; "−3" through "+3") at time "t" is denoted by x (n, t). This data is the measured acoustic data that is the first input data for use of the method.

The output of the sensor n is translated to the frequency domain by applying a discrete Fourier transform (DFT) or a fast Fourier transform (FFT) to a set of contiguous time samples x (n, t=$T_0$ to $T_{max}$). This frequency domain output is denoted by X (n, ω), where n again is the sensor number and ω is the frequency index. The frequency domain sensor output for a fixed frequency ω defines the N×1 data vector x=[X (−Na, ω) X (−(Na−1), ω) . . . X (Na−1, ω) X (Na, ω)]$^T$. Here, Na is (N−1)/2, assuming N is odd; and T represents the vector transpose operator.

Often the data vector x is replaced by a sample co-variance matrix "R" (the heard and measured data). The sample co-variance matrix is formed from the time average of successive snapshots of the "L" data vector:

$$R = \frac{1}{L}\sum_{t=1}^{L} x_t x_t^H \quad (1)$$

As indicated above, the method of the present invention requires a replica vector for a second data input. In the following description, the replica vector is referred to as "d". The replica vector d is the frequency domain N×1 vector representing the predicted or expected values at each sensor of the sensor array 10 for a specific frequency ω.

Conventional matched field processing forms an average of the projections between the data vector and the normalized replica vectors:

$$B_\omega = \frac{d^H R d}{|d^H d| tr(R)} \quad (2)$$

The denominator "$|d^H d| tr(R)$" in Equation (2) explicitly defines the normalization factors that ensure that the maximum value of the response is less than or equal to one. The tr( ) notation refers to the trace of a matrix, which is the sum of the diagonal elements.

Equation (2) defines the response of the method for a single vector d against the average of the L most recently measured data vectors. This response is a number between zero and one, and represents the degree to which the measured data vector matches the replica vector.

In matched field processing, the replica vector is a predicted quantity which is computed by an acoustic model that begins with an assumed acoustic point source location at a specific position in the water column. The acoustic model, which incorporates such parameters as an ocean temperature profile and an ocean bottom depth, calculates what the acoustic field would be at the sonar array 10. That is, each replica vector represents a prediction of the acoustic field at the sonar array 10, assuming that an acoustic point source is at a specific location in the water. An entire set of replicas represents some volume of the surrounding water.

The corresponding output of the method is an ambiguity surface. The ambiguity surface is a set of numbers ranging between zero and one with each number corresponding to a specific location in the ocean. The highest values on the ambiguity surface indicate the most likely position of an acoustic source.

The method of the present invention generalizes Equation (2) to a broadband matched field response. This broadband response "B" is computed by averaging the matched field response over multiple frequencies:

$$B = \frac{1}{W}\sum_{w=1}^{w} \frac{d^H R d}{|d^H d| tr(R)} \quad (3)$$

where "W" stands for a frequency, "H" indicates a complex conjugate transpose operation.

Finally, Equation (3) may be rewritten using Equation (1) to produce Equation (4):

$$B = \frac{1}{W}\sum_{t=1}^{T}\sum_{w=1}^{w} \frac{|d^H x_t|^2}{|d^H d| tr(R)} \quad (4)$$

As stated above, the replica vector d, or predicted measurement across the sonar array, is computed using an ocean acoustic model. Acoustic models can be categorized into four broad types: ray theory, spectral integral methods, normal mode theory, and parabolic equations. The following derivation of the method of the present invention uses ray theory, but the other model types are equally valid for use and may be substituted with by those ordinarily skilled in the art.

To begin, let d be an N×1 replica vector that describes the complex pressure at angular frequency ω, sampled at each of N sensors in the array 10. Each element $d_n$ of d is a sum of P eigenrays computed by the acoustic model:

$$d_n = \sum_{p=1}^{P} \alpha_{p,n} \exp[-(j\omega\tau_{p,n} + j\phi_{p,n})] \quad (5)$$

Each eigenray, indexed by "p", has an amplitude αp,n, an additive phase shift ϕp,n (due to reflections and/or refraction efforts) and phase $\omega\tau_{p,n}$. The phase term contains the total travel time $\tau_{p, n}$ from the acoustic source to the sensor n along the eigenray p. In the vicinity of the sensor 0, (i.e., over the extent of the sonar array), it is assumed that the amplitude $\alpha_{p, 0}$ and additive phrase $\phi_{p, 0}$ are approximately constant. Also, the phase at the sensor n may be approximated as $$\omega(\tau_{p,0}+\tau_{p,n}). \quad (6)$$

Here, $\tau_{p, 0}$ is the total travel time of the signal from the source to the sensor 0 along the p$^{th}$ eigenray, and $\Delta\tau_{p, n}$ is an additional travel time from the sensor 0 to the sensor n. Equation (5) may be approximated as:

$$d_n \approx \sum_{p=1}^{P} \alpha_{p,0}\exp[-(j\omega(\tau_{p,0} + \Delta\tau_{p,n}) + j\varphi_{p,0})] \quad (7)$$

$$= \sum_{p=1}^{P} \underbrace{\alpha_{p,0}\exp[-(j\omega\tau_{p,0} + j\varphi_{p,0})]}_{d_{p,0}=e_p}\underbrace{\exp[-j\omega\Delta\tau_{p,n}]}_{s_{p,n}}$$

In Equation (7), $s_{p,n}$ is a relative phase shift that is applied to $d_{p, 0}$ to adjust for the additional travel time from sensor 0 to sensor n. Assembling the individual elements $d_n$ into the N×1 replica vector d and forming the N×1 steering vector $s_p$ for each eigenray p:

$$d = \sum_{p=1}^{P} d_{p,0} s_p = \sum_{p=1}^{P} e_p s_p \quad (8)$$

In Equation (8), the eigenray steering vector is introduced as $S_p$, an N×1 vector of phase shifts $-\exp[-j\omega\Delta\tau_{p,n}]$. The $\Delta\tau_{p,n}$ is the travel time of an acoustic wave along the eigenray p from the array origin to the sensor n. In general, an eigenray may be viewed as defining the normal of a spherically spreading wavefront (i.e. the direction of propagation). This directionality may be related to an arrival angle at the horizontal sonar array.

Figure 2:
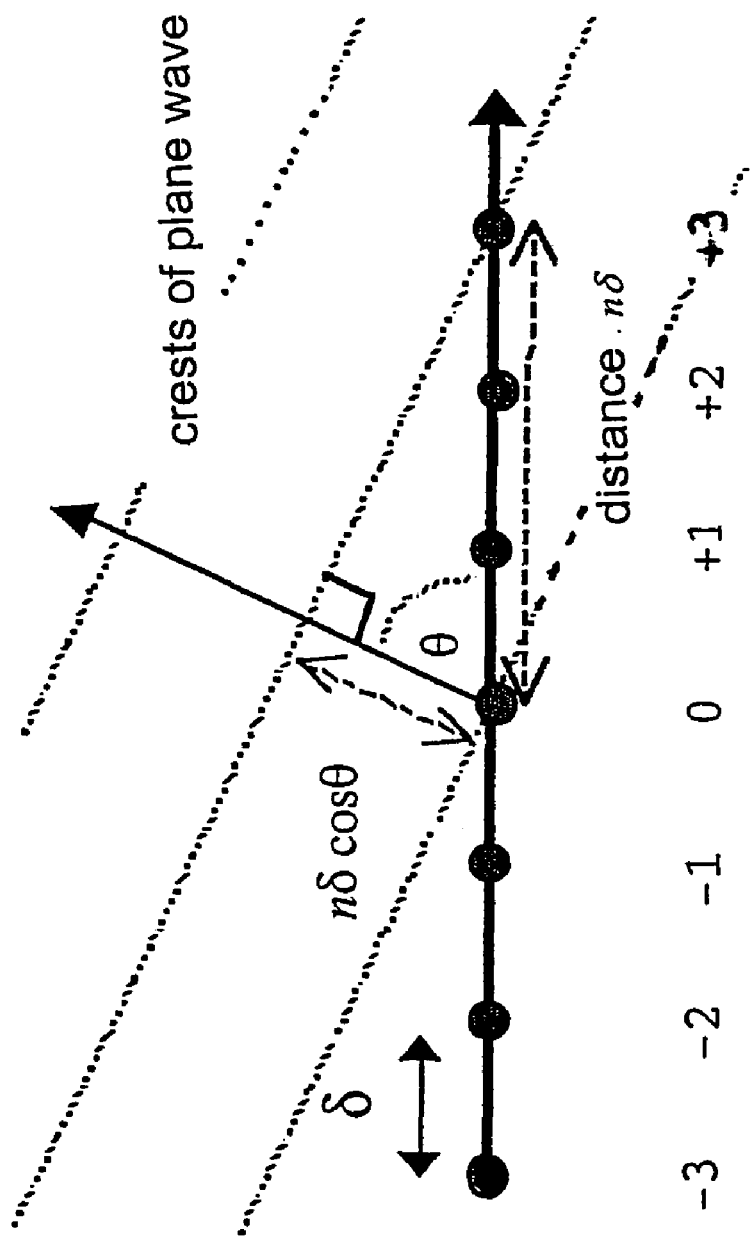
FIG. 2 depicts the horizontal line array of equispaced sensors with a direction of propagation.

As depicted in FIG. 2, $\Delta\tau_{p,n}$ is:

$$\Delta\tau_{n,\theta_p} = \frac{-n\delta\cos(\theta_p)}{c} \quad (9)$$

where δ is the sensor spacing, n is the sensor index, c is the local speed of sound, and $\theta_p$ is the arrival angle of eigenray p. This linear time delay as a function of sensor position corresponds to well-known planewave beamforming. This method for estimating $\Delta\tau_{p,n}$ can be refined to account for near field effects by using range focusing techniques.

Substituting Equation (8) into the numerator of the response given by Equation (4):

$$d^H x = \left( \sum_{p=1}^{P} e_p s_p \right)^H x = \sum_{p=1}^{P} e_p^* \underbrace{(s_p^H x)}_{b_p}. \quad (10)$$

In Equation (10), $b_p$ is the complex beamformer output resulting from application of the steering vector for eigenray p to the frequency domain sensor data x. That is, $b_p$ is computed by forming a beam steered at the conical angle $\theta_p$. This is done for each of the P eigenrays. The advantage to doing this is that there exists an efficient algorithm for rapidly computing a beam (i.e. k–ω beamforming for a line array). Effectively, this process reduces the computation from N sensors to P directional sensors.

Letting "e" be the P×1 vector of eigenrays from the source to the array origin, Equation (7), and "b" be the P×1 beamformer outputs, Equation (10) may be written as:

$$d^H x = e^H b \quad (11)$$

Thus the numerator of Equation (4) may be rewritten as the magnitude squared $|e^H b|^2$.

To account for the normalizing factors in the denominator of Equation (4), the data vector x is divided by the average over time of $x^H x$. The eigenray vector e may be normalized by $e^H e$. This approximation is generally effective when processing broadband contiguous frequencies so that the individual variation from frequency to frequency averages out. Incorporating the normalizing factors and Equation (11) into Equation (4) the method of the present invention is defined to be:

$$B = \frac{1}{W} \sum_{w=1}^{W} \frac{1}{tr(R_w)} \sum_{t=1}^{T} \frac{|e_w^H b_{w,t}|^2}{|e_w^H e_w|} \quad (12)$$

This result states that a matched field response for a horizontal line array may be computed by first forming P beams and then combining them by multiplying each by a complex eigenray factor before summing. The complex eigenray factor makes up components of the vector e used in Equation (12). The individual components of vector e are first defined in equation (7).

Furthermore, the eigenray factors need only be computed for the origin of the sensor array 10, and not for each individual sensor in the array. Of course, for very long arrays, the approximations used in the derivation of the algorithm may no longer apply. In such instances, the sensor array 10 must be treated as a set of shorter subarrays. The sensor array 10 of N hydrophones (sensors) is reduced to some number of effective sensors P<N.

The full computation of the matched field response may be further reduced by applying voxel interpolation. A voxel, or volume element, is a three-dimensional region in space, with dimensions of range (x-axis), depth (y-axis) and bearing (angular width).

Figure 3:
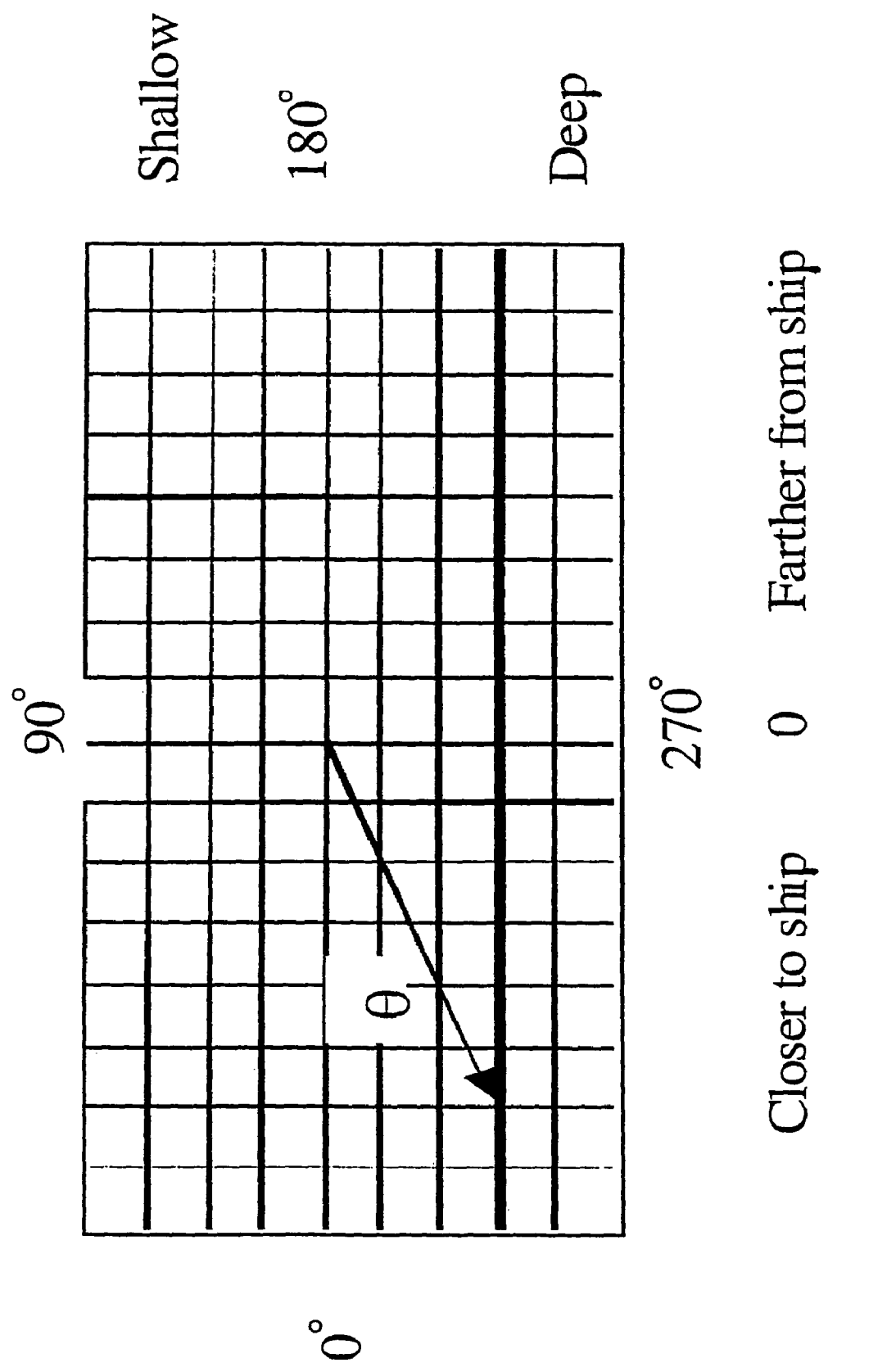
FIG. 3 depicts a voxel sampled by a grid representing locations in the ocean surrounding an origin.

FIG. 3 depicts a voxel that has been sampled by a grid representing locations in the ocean surrounding an origin. The third dimension has been suppressed. The grid points of the voxel are spaced two meters in the vertical and twenty meters in the horizontal. A typical voxel is sampled ten times in range and forty times in depth, for a total extent of two hundred meters in range and eighty meters in depth. Each point, referred to as a subvoxel, is designated by its polar coordinates—the distance from the voxel origin and an angle from the horizontal.

In the figure, the angular coordinate is zero degrees in the horizontal direction pointing directly toward the sonar array; at ninety degrees pointing directly vertical to the ocean surface; and 180 degrees away from the sonar array; and 270 degrees toward the ocean bottom.

Voxel interpolation relies on the concept that an acoustic source displaced from the voxel origin at a distance ρ and at an angle θ may be approximated as a perturbation to the eigenrays departing from the voxel center, as computed by an acoustic model.

Specifically, the eigenrays generated by an acoustic model for the voxel origin are each defined by travel time, attenuation, additive phase, arrival angle and departure angle. The last two parameters listed predicate that an eigenray departs from a point source at some angle from the horizontal, and proceeds up or down through various reflections before finally approaching the arrival point at some other angle, also measured relative to the horizontal.

If the source location of an eigenray is offset from an original departure point by a small amount then it may be assumed that the perturbed eigenray has approximately the same attenuation, additive phase, arrival angle and departure angle, and the single significant deviation is in total travel time. That is, if an eigenray e is defined by:

$$e = \alpha\exp[-(j\omega\tau + j\phi)] \quad (13)$$

then the perturbed eigenray e' displaced from the origin by distance ρ and angle θ is given by:

$$e' \approx \alpha\exp[-(j\omega(\tau+\Delta) + j\phi)] \quad (14)$$

where Δ is the delta to the total travel time of the eigenray.

Using the angle conventions defined above, the delta for eigenray e' with a departure angle of ψ is:

$$\Delta = \frac{-\rho\cos(\theta - \psi)}{c} \quad (15)$$

where "c" is the local speed of sound. This result is used to efficiently compute a real time matched algorithm output response, given by Equation (12), for each of the subvoxels in the region comprising the voxel.

In the operational stages, the field processing of the real time matched algorithm requires and presumes certain hardware and software components including a linear array or a set of linear arrays with equispaced hydrophones. The array(s) may be fixed or towed. Ideally, the array provides measurements such as array heading and array depth from devices embedded along the length of the array.

Further components include an ocean acoustic model and digital processing hardware suitable for executing both the ocean acoustic model and the real time matched field processing algorithm.

Figure 4:
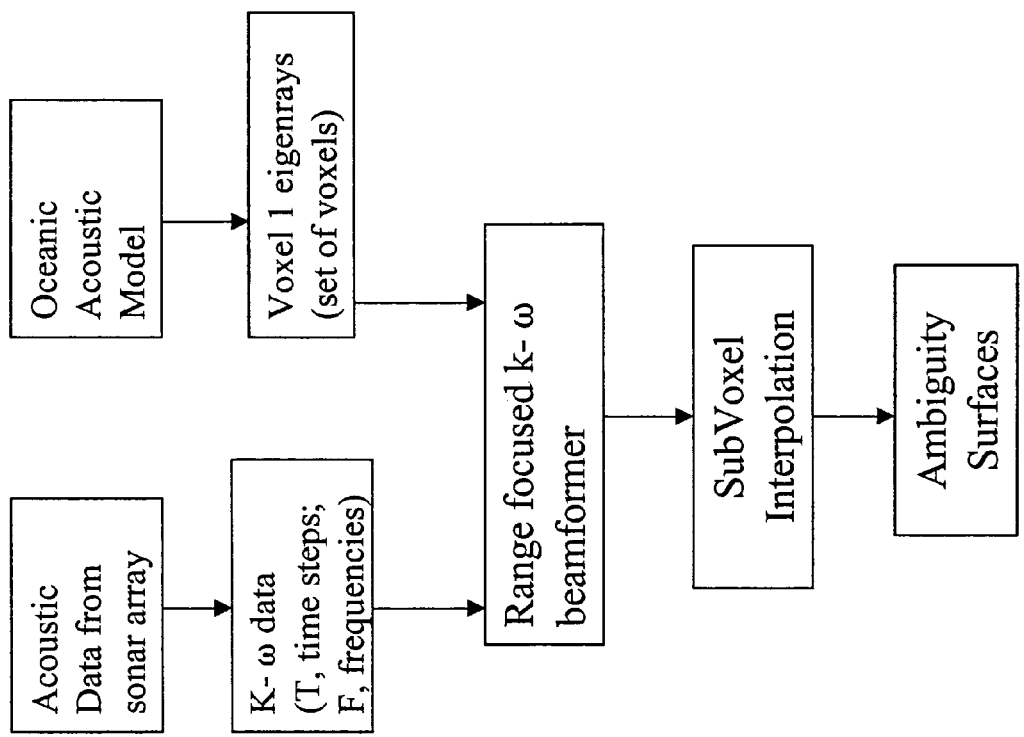
FIG. 4 depicts a block diagram for real time matched field processing.

Using FIG. 4 as guidance, the input needed for the method of the present invention is sonar sensor data from a line type array that has been transformed to the wavenumber-frequency domain. Multiple snapshots (moments in time) may be passed into the process; however, there is a practical limit due to the dynamic nature of the sensor array and the changing environment.

Needed input is also the set eigenrays for each voxel to be processed. The real time matched field processing algorithm does not stipulate what voxels should be processed, nor in what order. Additionally, the number of eigenrays per voxel is not strictly defined by the algorithm. It is recommended that only those eigenrays that contribute a significant fraction of the pressure field be included in the processing.

The method of the present invention is now described for one time step and one frequency. The full output of the process given by Equation (12) requires that this process be repeated and averaged over time and frequency.

The process begins by computing the eigenrays between the source at the origin of a voxel and the destination at the acoustic center of the sonar array 10. Only the most significant P eigenrays are retained. The most significant eigenrays are chosen by computing the eigenrays that describe the acoustic signal at one spot in the ocean. This set of eigenrays is sorted by the energy of each eigenray, large to small. Add the energy of each eigenray in the set, strong to weak, until the sum of the energies represents ninety percent of the total.

A beam is then formed for each of the P eigenrays. That is, using an efficient range focused k–ω beamforming algorithm, a beam is computed that is steered exactly at the conical angle coinciding with the arrival angle of the eigenray being considered. The result of this step is a P×1 complex vector "b" representing the P beams formed along the P (possibly non-unique) conical arrival angles.

The individual beams are then attenuated and phase shifted as indicated by Equations (10) and (11). Let f be the P×1 vector resulting from this step (i.e., $|e^H b|^2 = |f^H f|$). Note that the magnitude square of the complex summation of the P result, $|e^H b|^2$ is the real time matched algorithm response for the center of the voxel.

For the subvoxel at location (ρ θ); compute P phase shifts $-\exp[-j\omega\Delta_p]$, where $\Delta_p$ of each is defined by Equation (15) to form the P×1 vector "g". The real time matched algorithm output for the subvoxel is then $|g^H f|^2$—note that the phase shifts have been conjugated to account for the complex conjugate transpose operator. Repeat for each subvoxel in the voxel.

A significant advantage of the described method of the present invention is the savings in computational cost. The computational advantage supports the feature of processing mobile horizontal towed array sonar data by using digital processing in real time. Specifically, the first savings arises from the feature that the acoustic model computes the eigenrays only between the center of the sonar array 10 and the center of the voxel. This is in contrast to computing the eigenrays between every source point (for example: the 400 subvoxels) and every destination point (for example: 50 individual hydrophones), a factor of 20,000 greater computation.

Second, the subvoxel response is computed using P (inputs) rather than N (the number of sensors). This reduces the cost of the computation by (N/P), or approximately by a factor of five for many applications.

Third, the method of the present invention takes advantage of k–ω beamforming, an N log N computation as compared to the $N^2$ computation which would otherwise be required.

Fourth, the range focused k–ω beamforming supports efficient compensation for some shape distortion of the sonar arrays.

The foregoing description of the preferred embodiment of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for real time matched field, processing to locate the position of an acoustic source, said method comprising the steps of:
    providing at least one linear array, the linear array including equispaced hydrophones;
    providing a processor;
    measuring acoustic data from at least one of the equispaced hydrophones;
    providing a first data input from said measuring step;
    transforming by the processor the first data input to a frequency domain with a Fourier transform to a set of continuous time samples from said at least hydrophone;
    defining a data vector from the frequency domain;
    determining at least one replica vector representing a predicted value of the at least one sensor output for a specific frequency;
    averaging multiple replica data sets of the at least one replica vector to the first data input;
    determining a closest matched data set to the first data input from said averaging step; and
    outputting an ambiguity surface as a set of numbers in a range between zero and one with a highest value corresponding to the position of an acoustic source.

2. The method in accordance with claim 1, said method comprising the further step of replacing the data vector with a co-variance matrix from a time average of successive moments in time of the data vector.

3. The method in accordance with claim 2, said method comprising the further steps of:
    determining a broadband matched field response over multiple frequencies by the equation:

$$B = \frac{1}{W}\sum_{w=1}^{w} \frac{d^H R d}{|d^H d| tr(R)}; \text{ and}$$

rewriting said matched field averaging response as $$B = \frac{1}{W} \sum_{t=1}^{T} \sum_{w=1}^{w} \frac{|d^H x_t|^2}{|d^H d| tr(R)};$$

wherein B is the broadband response, w is the frequency, d is the replica vector and R is the co-variance matrix.

4. The method in accordance with claim 3, wherein said method employs ray theory by computing an acoustic model with the equation:

$$d_n = \sum_{p=1}^{P} \alpha_{p,n} \exp[-(j\omega \tau_{p,n} + j\phi_{p,n})]$$

wherein $d_n$ is a sum of P eigenrays, has an amplitude $\alpha_{p,n}$, an additive phase shift $\phi_{p,n}$ and phase $\omega \tau_{p,n}$ with total travel time from the acoustic source to the at least one sensor; and
approximately as $$d_n \approx \sum_{p=1}^{P} \alpha_{p,0} \exp[-(j\omega(\tau_{p,0} + \Delta\tau_{p,n}) + j\varphi_{p,0})]$$

$$= \sum_{p=1}^{P} \underbrace{\alpha_{p,0} \exp[-(j\omega\tau_{p,0} + j\varphi_{p,0})]}_{d_{p,0}=e_p} \underbrace{\exp[-j\omega\Delta\tau_{p,n}]}_{s_{p,n}};$$

wherein $s_{p,n}$ is a relative phase shift that is applied to $d_{p,0}$ to adjust for additional travel time between sensors of the sonar array of sensors.

5. The method in accordance with claim 4, said method further comprising the steps of:
assembling $d_n$ into the replica vector d; and
forming the steering vector $s_p$ for each eigenray p by the equation:

$$d = \sum_{p=1}^{P} d_{p,0} s_p = \sum_{p=1}^{P} e_p s_p,$$

wherein the steering vector is an N×1 vector of phase shifts $-\exp[-j\omega\Delta\tau_{p,n}]$ as $\Delta\tau_{p,n}$ being the travel time of an acoustic wave along the eigenray from an array origin to the at least one sensor.

6. The method in accordance with claim 3, said method further comprising the step of computing:

$$d^H x = \left(\sum_{p=1}^{P} e_p s_p\right)^H x = \sum_{p=1}^{P} e_p^* \underbrace{(s_p^H x)}_{b_p};$$

wherein $b_p$ is a complex beamformer output resulting from application of the steering vector from eigenray p to the frequency domain sensor x.

7. The method in accordance with claim 6, said method further comprising the steps of computing:

$$B = \frac{1}{W} \sum_{w=1}^{W} \frac{1}{tr(R_w)} \sum_{t=1}^{T} \frac{|e_w^H b_{w,t}|^2}{|e_w^H e_w|};$$

forming P beams; and
combining the P beams by multiplying each by a complex eigenray factor; and
summing the beams.

8. The method in accordance with claim 7, said method further comprising the step of computing an eigenray factor for an origin of the sensor array.

9. The method in accordance with claim 7, said method further comprising the step of applying voxel interpolation to the matched field response.

10. The method in accordance with claim 9, said voxel interpolation step comprising the steps of:
determining a sample voxel as a three-dimensional region in space;
designating subvoxels in relation to the sample voxel as polar coordinates as a distance from an origin of the sample voxel and an angle from the horizontal;
computing the eigenrays between a source at the origin voxel and a destination at an acoustic center of the sonar array;
retaining the eigenray having the most energy;
forming a beam for each of the P eigenrays that is steered exactly at a conical angle coinciding with an arrival angle of the eigenray being considered;
attenuating and phase shifting the individual beams;
determining a real time matched algorithm output response by the equation $$B = \frac{1}{W} \sum_{w=1}^{W} \frac{1}{tr(R_w)} \sum_{t=1}^{T} \frac{|e_w^H b_{w,t}|^2}{|e_w^H e_w|}; \text{ and}$$

repeating for each of the subvoxels in the voxel.

11. The method in accordance with claim 10 wherein the eigenrays generated by an acoustic model of the voxel origin are each defined by travel time, attenuation, additive phase, arrival angle and departure angle.

12. The method in accordance with claim 11 wherein eigenrays offset from an original departure point are determinable to compute a real time matched algorithm output response for each of the subvoxels in the region comprising the voxel.

* * * * *